(12) United States Patent
Upreti et al.

(10) Patent No.: US 8,795,753 B2
(45) Date of Patent: *Aug. 5, 2014

(54) METHOD FOR REDUCING PROOFING TIME FOR BAKED AND OTHER PRODUCTS

(75) Inventors: Praveen Upreti, Orchard Park, NY (US); Rohit Jalali, Ridgeway (CA); Melissa D. Haller, Orchard Park, NY (US)

(73) Assignee: Rich Products Corporation, Buffalo, NY (US)

( * ) Notice: Subject to any disclaimer, the term of this patent is extended or adjusted under 35 U.S.C. 154(b) by 514 days.

This patent is subject to a terminal disclaimer.

(21) Appl. No.: 12/687,663

(22) Filed: Jan. 14, 2010

(65) Prior Publication Data

US 2010/0166911 A1 Jul. 1, 2010

Related U.S. Application Data

(63) Continuation-in-part of application No. 11/641,300, filed on Dec. 18, 2006, now Pat. No. 7,972,642.

(60) Provisional application No. 61/144,519, filed on Jan. 14, 2009, provisional application No. 60/753,518, filed on Dec. 23, 2005.

(51) Int. Cl.
*A21D 2/00* (2006.01)

(52) U.S. Cl.
USPC ............. 426/498; 426/496; 426/312; 426/18; 426/62; 426/549

(58) Field of Classification Search
None
See application file for complete search history.

(56) References Cited

U.S. PATENT DOCUMENTS

| | | | | |
|---|---|---|---|---|
| 691,749 | A | | 1/1902 | Corbey et al. |
| 2,221,327 | A | * | 11/1940 | Rhodes ......................... 425/147 |
| 3,031,980 | A | | 5/1962 | Bonomo et al. |
| 3,111,059 | A | | 11/1963 | Marsh |
| 3,332,370 | A | * | 7/1967 | Brastad ......................... 426/243 |
| 3,424,590 | A | | 1/1969 | Booras |
| 3,615,678 | A | * | 10/1971 | Tangel et al. .................. 426/19 |
| 4,303,677 | A | * | 12/1981 | De Acetis ...................... 426/27 |
| 4,369,193 | A | | 1/1983 | Collins et al. |
| 4,406,911 | A | | 9/1983 | Larson et al. |

(Continued)

FOREIGN PATENT DOCUMENTS

| | | |
|---|---|---|
| DE | 19643712 A1 | 4/1998 |
| EP | 0326404 A2 | 8/1980 |

(Continued)

OTHER PUBLICATIONS

Didier Rosada Sep. 1, 2004 "Flour combination sweetens whole grain bread" pp. 1-5 http://modern-baking.com/bread_pastry/mb_imp_7271/.*

(Continued)

*Primary Examiner* — Felicia King
(74) *Attorney, Agent, or Firm* — Fay Sharpe LLP

(57) ABSTRACT

A method for producing dough which has reduced proofing time. The proofing time is at least 33% less that required in the absence of vacuum exercising. The method comprises mixing the dough ingredients, forming gas nucleation sites by proofing the dough, exercising the dough by subjecting the dough to cycles of differential pressure, allowing the dough to return to ambient pressure and then, optionally, baking the dough.

27 Claims, 2 Drawing Sheets

(56) References Cited

U.S. PATENT DOCUMENTS

| | | |
|---|---|---|
| 4,743,452 A | 5/1988 | Felske et al. |
| 4,847,104 A | 7/1989 | Benjamin et al. |
| 5,030,466 A | 7/1991 | Kageyama et al. |
| 5,458,902 A | 10/1995 | Rudel |
| 5,560,946 A | 10/1996 | Sanders et al. |
| 6,025,001 A | 2/2000 | Nonaka et al. |
| 6,399,120 B1 | 6/2002 | Kambe et al. |
| 6,419,965 B1 | 7/2002 | Douaire et al. |
| 6,579,554 B2 | 6/2003 | Moder et al. |
| 6,589,583 B1 | 7/2003 | Hansen et al. |
| 6,660,311 B2 | 12/2003 | Goedeken et al. |
| 6,884,443 B2 | 4/2005 | Domingues et al. |
| 2001/0043978 A1 | 11/2001 | Moder et al. |
| 2002/0106432 A1 | 8/2002 | Yamagata et al. |
| 2003/0049358 A1 | 3/2003 | Domingues |
| 2003/0064138 A1 | 4/2003 | Lonergan et al. |
| 2003/0104100 A1 | 6/2003 | Goedeken et al. |
| 2003/0152667 A1 | 8/2003 | Goedeken et al. |
| 2003/0157222 A1 | 8/2003 | Henry et al. |
| 2003/0165605 A1 | 9/2003 | Brown et al. |
| 2004/0076722 A1 | 4/2004 | Archibald et al. |
| 2004/0156968 A1 | 8/2004 | Fisson et al. |
| 2005/0202126 A1 | 9/2005 | Zhang et al. |
| 2007/0160709 A1 | 7/2007 | Upreti et al. |

FOREIGN PATENT DOCUMENTS

| | | |
|---|---|---|
| EP | 0353036 A1 | 1/1990 |
| EP | 0749690 A1 | 12/1996 |
| ES | 2144247 T3 | 6/2000 |
| FR | 2733669 A1 | 11/1996 |
| GB | 2264623 A | 9/1993 |
| WO | 9830105 A2 | 7/1998 |
| WO | 03024233 A1 | 3/2003 |
| WO | 03067992 A1 | 8/2003 |

OTHER PUBLICATIONS

N F Petrenko SU 1184504 Derwent abstract 2 pages.*
Gandikota et al.; Expansion capacity of doughs: methodology and applications; Journal of Cereal Science, Feb. 2005, vol. 42; pp. 157-163.
The American Heritage Dictionary New College Edition; 1976; p. 1186.

* cited by examiner

METHOD FOR REDUCING PROOFING TIME FOR BAKED AND OTHER PRODUCTS

CROSS-REFERENCE TO RELATED APPLICATIONS

This application claims priority to U.S. provisional application No. 61/144,519, filed on Jan. 14, 2009, and is a continuation-in-part of U.S. application Ser. No. 11/641,300, filed on Dec. 18, 2006, which in turn claims priority to U.S. provisional application No. 60/753,518, filed on Dec. 23, 2005, the disclosures of which are incorporated herein by reference.

FIELD OF THE INVENTION

The present invention relates generally to processing of dough and more particularly provides a method for producing dough which requires reduced proofing time.

BACKGROUND OF THE INVENTION

The traditional process of baking includes mixing of ingredients, kneading of dough, dividing the dough into smaller portions, shaping and molding of dough pieces, proofing it to a particular volume, and baking. This process is time-consuming. In dough processing, the proofing step requires a significant amount of time. Proofing time is generally 60 to 90 minutes. Proofing rate can be increased (and proofing time decreased) by increasing the yeast amount or increasing yeast metabolism by modifying temperature and relative humidity (RH). However, higher amount of yeast leads to higher residual glutathione and other enzymes from dead yeast (negatively impacting shelf life and flavor), higher cost, shorter processing window, greater quality differences/defects. Higher temperature/RH can also make the dough sticky and difficult to process.

SUMMARY OF THE INVENTION

All percentages included in this specification and claims represent weight percentages based on the flour weight (baker's percentage) unless indicated otherwise.

The present invention describes the processing conditions, where dough is exercised by exposure to two or more cycles of pressure differential after partially proofing the dough. Application of pressure differential cycles according the present invention reduces the proofing time required without compromising the quality or organoleptic properties of the baked product. In one embodiment, the baked product has a baked specific volume of at least 3.5 cc/g. The method of the present invention comprises, mixing the dough, dividing the dough, proofing the dough, exercising the dough by subjecting to cycles of higher and lower pressures, bringing the dough back to ambient pressure, and baking the dough. The exercising is done by subjecting the dough to alternating higher and lower pressures wherein at least the low pressure in each cycle is lower than ambient pressure (vacuum).

The method of preparing the dough comprises creating "gas nucleation sites" in the dough during proofing, followed by exercising the dough. While not intending to be bound by any particular theory, it is considered that exercising the dough affects the gas nucleation sites and results in restructuring of the dough matrix. The dough of the present invention can reduce cost of processing and increase throughput in bakeries. For example, if a dough requires a proofing time of 60-90 minutes to achieve a certain baked specific volume, by using the additional step of exercising the dough as described herein (while keeping the formulation and all other parameters the same), the proofing time is reduced to 10-50 minutes.

In one embodiment, the present invention provides a method of producing a dough or dough product comprising the steps of: (a) preparing dough by mixing flour having a gluten content in the range of 10-20%, water, emulsifier(s), yeast, stabilizers, and, optionally, a lipid source; (b) forming gas nucleation sites in the dough by proofing to increase the specific volume to 1.9 to 2.2 cc/g; (c) exercising the dough by subjecting it to at least two cycles of alternating first and second pressures, wherein the first pressure is greater than the second pressure and wherein the pressure differential between the first and the second pressure is in the range of 1 and 20 inches of Hg; and (d) allowing the dough to return to ambient pressure. As a result of processing the dough according to these steps, the proofing time is at least 33% less than the time required to achieve the same specific volume under the same proofing conditions as step b) (e.g., same yeast concentration, temperature and humidity) if the dough is not subjected to the vacuum exercising of step (c). The method optionally comprises a baking step where the dough, which has been allow to return to ambient pressure, is baked and the resulting baked product has a baked specific volume of 3.5-7 g/cc.

In various embodiments, the proofing time is at least 50% or 33% to 66% less than the time required to achieve the same baked specific volume if the dough is not subjected to vacuum exercising of step (c). In another embodiment, the proofing time is 10, 11, 12, 13, 14 or 15 minutes at a temperature of 95° F. and a humidity of 85% RH.

In one embodiment, the first pressure is ambient pressure. In another embodiment, the second pressure is 10 to 15 inches of Hg less than ambient pressure. In yet another embodiment, the time for which the dough is held at the second pressure (i.e., the lag time) is up to 5 minutes.

In one embodiment, the rate of change of pressure in vacuum exercising step (c) is from 0.1 to 1.9 psi/second or from 0.25 to 1.5 psi/second. In another embodiment, the vacuum exercising is carried out by subjecting the dough to 3, 4 or 5 cycles of alternating higher and lower pressure.

In another embodiment, the dough is divided into dough pieces having a mass of 10 to 1500 grams.

DETAILED DESCRIPTION OF THE INVENTION

Figure 1:
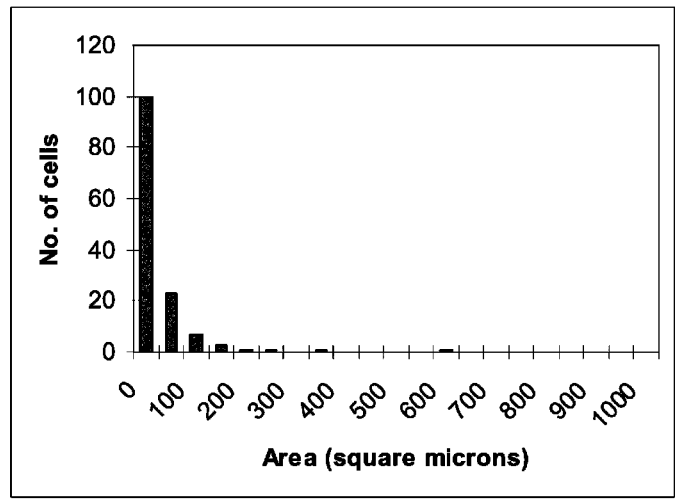
FIGS. 1A and 1B are representations of the number of air cells having the indicated area in dough which has not been subjected to exercising (1A) or from dough which has been subjected to exercising (1B).

The present invention will now be described in detail for specific embodiments of the invention, it being understood that these embodiments are intended only as illustrative examples and the invention is not to be limited thereto.

The present invention relates to a method for making dough that requires less processing time (such as less proofing time) than conventional doughs. For example, a 12 minute proofing step was sufficient using the vacuum exercising as described in the present invention to produce a product with a baked specific volume (BSV) that required a 90 minute proofing without the use of the vacuum exercising.

In one embodiment, dough subjected to the vacuum exercising of the present invention requires at least 33% less proofing time than dough processed conventionally (i.e., not subjected to vacuum exercising) to result in baked products having a specific volume of 3.5-7 cc/gram. In another embodiment, the dough requires 33-66% less proofing time. In yet another embodiment, the dough requires at least 50% less proofing time. In still another embodiment, the dough requires 33-90%, including all integers and ranges therebetween, less proofing time The dough of the present invention comprises flour, water, yeast, one or more emulsifiers and one or more dough stabilizers, and optionally, fat/lipid, to produce dough which, as a result of processing as described herein, requires less proofing time.

The gluten content of the dough should be in the range of 10 to 20 wt %, with higher gluten levels generally giving dough with better gas-holding ability. It is considered that higher gluten levels generally result in a dough with better gas-holding ability. Typically, flour sold as "high gluten" generally contains about 12.5 to 15% gluten. However, it is to be understood that gluten levels can fluctuate from product to product or season to season. If desired, high-gluten flour can be used as the only flour in the dough, or it can be used with other flours. For example, the gluten content for hard rolls is in the range of from 12-20%.

Typically, flour sold as "high gluten" generally contains about 12.5 to 15% gluten. However, it is to be understood that gluten levels can fluctuate from product to product or season to season. If desired, high-gluten flour can be used as the only flour in the dough, or it can be used in combination with other flours.

Flours which can be used in the doughs of the present invention include, but are not limited to, wheat flour, potato flour and bread flour, or combinations and mixtures thereof. The flour of the present invention may be enriched flour, i.e., flour that contains federally mandated amounts of flour, niacin, ferrous sulfate, riboflavin, enzyme, and thiamine mononitrate folate.

The dough of the present invention may comprise additional gluten or gluten hydrolysates. Gluten is known to contain gliadin and glutenin. Accordingly, these individual components or combinations thereof may be used instead of gluten. The gliadin may be alpha, beta, gamma or omega gliadin or combinations thereof.

The dough of the present invention may include flour from one or more grains (such as oat, corn, barley, wheat, rye and the like). The dough may include particulate materials from the grains (such as crushed wheat particles). Further, the dough may also include whole seeds or crushed seeds. Useful seeds are well known in the art and include sunflower seeds, caraway seeds, flax seeds, sesame seeds and the like. Thus, multigrain products can be prepared to improve the taste and/or to add nutritional value.

In one embodiment, the flour is gluten-free flour. The gluten-free flour may be rice flour, tapioca flour, potato flour, buckwheat flour, teff flour or combinations thereof or any other flour which does not have gluten in it. In gluten-free dough formulations, starches and/or gums may be used to provide the texture and rheological properties similar to gluten-containing doughs. Therefore, the gluten-free dough formulation also comprises one or more of the following: starches and/or modified starches (such as from rice, tapioca, potato and the like), protein from dairy sources (such as nonfat dry milk) or non-dairy sources (such as egg), gums, leavening means, dough conditioners, gelatin, enzymes, sweeteners and fat (such as oils and shortening).

Sufficient water may be added to the present doughs to achieve the desired consistency. The precise amount of water depends on factors known to those skilled in the art, including the type of yeast used, the desired final product, and the amount and type of other ingredients. Water can be added in an amount of about 45 wt % to about 75 wt %, on flour weight basis.

The dough of the present invention comprises one or more types of yeast. Gas nucleation sites are formed in the dough by the action of yeast during proofing. The yeast is present in an amount from 3-14%. In one embodiment, the yeast content is 3-6% compressed yeast. All yeast percentages are indicated as weight %, not baker's %.

Yeast can be purchased and used in different forms. The driest commonly used yeast, sometimes referred to as "instant" yeast, contains 3.5-6.0% moisture. Cream yeast contains about 80-85% moisture; compressed yeast contains about 66-73% moisture; and active dry yeast contains about 6-8% moisture. Other examples include baker's yeast, protected active dry yeast, frozen yeast and the like. Generally, compressed yeast can be used. However, the invention is in no way limited to compressed yeast. For a given quantity of compressed yeast, one of ordinary skill in the art could easily determine the "compressed yeast equivalent," i.e., the quantity of another form of yeast having a different degree of hydration than compressed yeast, but containing the same amount of yeast as the given quantity of compressed yeast. For example, 1% compressed yeast is equivalent to about 1.5-1.8% cream yeast, which is equivalent to about 0.375-0.5% active dry, which is equivalent to about 0.3125-0.4% instant yeast.

Alternatively, or additionally, chemical leavening can also be used to generate gas nucleation sites. Chemical leavening typically involves using leavening agents (such as sodium acid phosphate (SAPP) or sodium aluminum phosphate (SALP)) with baking soda or a combination thereof.

The dough of the present invention preferably comprises salt. Salt is generally added to promote better mixing, enhance flavoring, control moisture content within the dough, and/or to control yeast activity. Any commercially available fine-blending salt may be used.

The dough of the present invention may optionally comprise an effective type and amount of a lipid (also referred to herein as fat) source. The fat may be present in an amount from 0.1 to 2%. In one embodiment, oil is used. In general, most edible oils are suitable, and vegetable oil is preferred due to its taste and lubrication properties and its lack of trans fat. Examples of vegetable oils that may be used in accordance with the present invention include, but are not limited to, soybean oil, cottonseed oil, peanut oil, canola oil, corn oil, olive oil and sunflower oil. Flavored oils may also be used in addition to or in place of the oil of the present invention. Non-limiting examples of flavored oils include olive, sesame, ginger and the like. In one embodiment, a fat or shortening that has a sharp melting point with high initial softening point is used.

Lipid sources include, but are not limited to, emulsified oils. Non-limiting examples of such emulsified oils include shortening, butter or margarine. Glyceride shortenings derived from animal or vegetable fats and oils including synthetically prepared shortenings are suitable for use herein. The glyceride may contain saturated or unsaturated long chain acyl radicals having from about 12 to about 22 carbon atoms generally obtained from edible oils and fats such as corn oil, cottonseed oil, soybean oil, coconut oil, rapeseed oil, peanut oil, olive oil, palm oil, palm kernel oil, sunflower seed oil, wall flower oil, lard, tallow and the like. Examples of preferred shortenings according to the present invention include vegetable shortenings, soybean based shortenings or oils, hydrogenated soybean-based shortening or oil, corn oil, palm oil, hydrogenated palm oil, lard and tallow oils.

Hydrogenated shortening can be used if a slight crispiness to the outside of the cooked dough is desired. The hydrogenated shortening provides better crust definition, crispiness and better baked volume. Vegetable shortening that can be used in accordance with the present invention is preferably in the form of shortening flakes. Hydrogenated shortening is preferably used at a low concentration to minimize trans fat related issues.

The amount and type of fat source may be selected by those skilled in the art based on various factors including the ingredients of the frozen dough, and based on the desired taste and physical characteristics, such as maintaining a consistent internal structure.

The dough of the present invention comprises emulsifiers at 0.05% to 0.5% or higher as permissible under the FDA guidelines. Suitable emulsifiers include, but are not limited to, lecithin, hydroxylated lecithin; mono, di, or polyglycerides of fatty acids (such as stearin and palmitin mono and dyglycerides), polyoxyethylene ethers of fatty esters of polyhydric alcohols (such as the polyoxyethylene ethers of sorbitan distearate); fatty esters of polyhydric alcohols (such as sorbitan monostearate); polyglycerol esters of mono and dyglycerides (such as hexaglyceryl distearate); mono- and diesters of glycols (such as propylene glycol monostearate), and propylene glycol monopalmitate, succinoylated monoglycerides; and the esters of carboxylic acids (such as lactic, citric, and tartaric acids) with the mono- and diglycerides of fatty acids (such as glycerol lacto palmitate and glycerol lacto stearate), and calcium or sodium stearoyl lactylates (SSL) and all members of the sucrose ester family thereof, all varieties of diacetyltartaric esters of fatty acids, diacetyl tartaric acid ester of monoglyceride ("DATEMS"), and the like, and mixtures thereof.

The dough of the present invention includes one or more stabilizers which are typically hydrophilic colloids. These can be natural, e.g., vegetable based, or synthetic gums. Examples of suitable stabilizers include, but are not limited to, carrageenan, guar gum, locust bean gum, alginate, xanthan gum and the like or semi-synthetic such as methylcellulose, carboxy-methylcellulose, ethylcellulose, hydroxy-propylmethylcellulose (METHOCEL F-50 HG), and microcrystalline cellulose. Typically, a gum or combination of gums is employed with a sugar, e.g., dextrose carrier. The amount of these stabilizers for this product is between 0.2 to 1.6% or higher, as permissible under FDA guidelines.

The dough of the present invention may also include flavoring and/or coloring agents. The dough may optionally contain suitable amounts of, for example 0.01 to 0.5%, flavoring agents and/or coloring agents. When using flavorings, the amount of water and salt used in the dough may have to be adjusted to take into account, for example, the amount of salt and water already contained in the flavoring. It is believed that "fine tuning" of the amount of salt and water in the dough would be within the ability of one of ordinary skill in the art. An example of a suitable flavoring is butter flavor and fermented flavor. It will be appreciated by those skilled in the art that many different individual flavors can be used to achieve the ultimate desired flavor.

Vitamin and minerals may also be added to the dough as desired. Riboflavin is a commonly added vitamin to the dough. Vitamins and minerals may be added as enriched flour or added individually. In addition, calcium in absorbable or elemental form may also be added.

Sweeteners may be added to the present dough to provide texture and/or flavor. Sweeteners such as sugars may be added for the additional purpose of providing a source of energy for the yeast. In one embodiment, dextrose and/or other sugars such as sucrose, crystalline fructose, high fructose corn syrup (HFCS) or a combination of these sugars may be used. Alternatively or additionally artificial sweeteners such as aspartame, saccharine, sucralose, alitame, cyclamate and the like may also be used.

If desired, the dough of the present invention may contain oxidants such as azodicarbonamide, potassium iodate and the like.

The ingredients of the present invention may be included as a combination. For example, a dough conditioner combination comprising one or more of the following may be used: oxidants, enzymes, emulsifiers, stabilizers, flour and oil. A non-limiting example of such a conditioner is Tolerance Plus. The dough conditioner may also contain ascorbic acid (Tolerance Plus with AA). Other dough conditioners include Panodan, potassium bromate ingredient (PBRI) and azo dicarbon amide (ADA). Dough conditioners can be used in a wide range of weight percents, as long as their presence and amount does not cause the specific volume of the finished product to be less than 3.5 cc/gm. An acceptable range for most conditioners is in the range of from 0.3 to 2 flour wt %.

If desired, the dough of the present invention may also comprise enzymes. The enzymes may be selected from a group including, but not limited to, amylase, hemicellulase, glucose oxidase, xylanase and the like. Determination of the amount and type of enzyme is well within the purview of those skilled in the art. Enzymes may also result in an increased strength, improved extensiblity or elasticity, stability and reduced stickiness of the dough, thus resulting in improved machinability during manufacture. The effect on the dough may be particularly advantageous when lower gluten content flour is used. The improved machinability is of particular importance in connection with dough which is to be processed industrially. The amount and type of enzyme of the present invention may be determined by those skilled in the art depending on the specific desired resulting properties.

The dough of the present invention may include reducing agents, particularly for more flow in the oven. Suitable reducing agents include, but are not limited to, L-cysteine and glutathione. It is believed that the reducing agents contribute to the high gluten dough becoming more malleable.

After addition of all or some of the ingredients, dough mixing is performed. Preferably, the dough is shaped into a desired shape such as, a square, other polygons, or round, or rolled into rolls or donuts. For example, flat dough pieces are rolled out for pizza.

Dough Preparation.

In the first step, the ingredients of the dough are combined together. The combining step can include combining all of the ingredients at once or combining different combinations of ingredients first and then combining all of the ingredients together. For example, according to one embodiment, certain ingredients are combined to form a pre-mix, including for example, the salt, stabilizers and sugar. Then, the pre-mix is combined with the remaining ingredients including the flour, yeast, water and, optionally, the lipid source. The pre-mix and/or the final mixture can include one or more additional ingredients as set forth herein.

In one embodiment, the mixing of ingredients is carried out under ambient conditions (e.g., temperature, humidity and pressure).

According to a preferred embodiment of the present invention, the combining step includes mixing all the ingredients. The ingredients may be mixed with one another by mixing methods generally known in the art.

After combining the ingredients, they are then mixed (or further mixed if mixing steps have already taken place) by any suitable mixing apparatus, such as a Hobart mixer. By way of example only, the ingredients are mixed for about 1 to about 4 minutes on a first speed (low) and then for about 7 to about 20 minutes on a second speed (high), which is faster than the first speed. Preferably, the ingredients are mixed for about 2 minutes on low speed and for about 8-12 minutes on high speed.

In one embodiment, the dough is then divided into pieces and may be panned. For example, the dough pieces can be 10 g-1500 g (where the dough has a density of 0.9-1.1 g/cc). Any reference to dough is intended to include both bulk dough and dough pieces, unless otherwise stated.

After preparation of the dough, the dough is, optionally, rested in "ambient conditions" for 1-60 minutes, including all integers and ranges between 1 and 60 minutes. By "ambient conditions" it is meant that the dough is held at the environmental conditions (e.g., temperature, humidity) present in the area where the dough is processed. For example, ambient temperature is 65-80° F. and ambient humidity is 30-65% RH. This step is termed herein as resting. In one embodiment, the dough is held for 5-40 minutes, and preferably for 10-15 minutes, at ambient humidity and temperature.

After dough preparation, the dough is proofed at higher than ambient humidity and temperature. In one embodiment, the dough is proofed at 90 to 110° F., 70 to 95% RH for 10 to 60 minutes, and preferably for 10-15 minutes. In combination with the vacuum exercising, the dough is proofed for 10 minutes or more at the RH conditions and temperatures as described above. In various embodiments, the proofing time is between 10 to 60 minutes, including all integers and ranges therebetween.

In one embodiment, the proofing step can be replaced by a resting step or combination of resting and proofing steps. In either case, the time required to for resting and/or proofing is reduced by at least 33% relative to that required in the absence of an exercising step.

While not intending to be bound by any particular theory, it is considered that during the step of resting and/or proofing, relaxation of internal stresses in a dough piece takes place, and the fermentation process at least partly takes place leading to formation of gas nucleation sites (bubbles) in the dough matrix.

Generally, proofing (and/or resting) of dough results in an increase in the specific volume to about 4 cc/g. However, in the present invention, proofing (and/or resting) is carried out only to the point where the specific volume is from 1.9 to 2.2 cc/g (i.e., the dough is partially proofed). As a result of the vacuum/mechanical exercising as described herein, the rested/proofed dough having a specific volume of 1.9 to 2.2 cc/g is still able to achieve a baked specific volume of 3.5-7 cc/g (without the need for additional proofing) when directly transferred to the oven after the exercising step. The exercising step is considered to end when the dough is brought to ambient pressure after the at least two differential pressure cycles. Directly transferred means that there is no intervening step between the end of exercising and the beginning of the baking process.

After proofing, the dough pieces are exercised. Exercising the dough as used herein refers to subjecting the dough to mechanical stresses so as to restructure the dough matrix. Such restructuring may involve reducing the number of air cells and/or shifting the air cells size distribution toward larger air cells.

In one embodiment, the exercising is vacuum exercising. In one embodiment, the dough can be exercised by subjecting the dough to alternating higher and lower pressure such that the pressure differential between the higher (a first pressure) and the lower pressure (a second pressure) is between 1 to 20 inches of Hg. In various embodiments, the pressure differential between the first and the second pressure can be 1, 2, 3, 4, 5, 6, 7, 8, 9, 10, 11, 12, 13, 14, 15, 16, 17, 18, 19 or 20 inches of Hg. In one preferred embodiment, it is 10-15 inches of Hg. In another embodiment, the first pressure may be a lower pressure and the second pressure a higher pressure. In another embodiment, it is about 10 inches of Hg. In one embodiment, the pressure differential can be achieved by alternating cycles of negative and positive pressure. In this process, cycles of lower and higher of pressure are practiced, and pressure can be varied by any means such as, but not limited to, mechanical pressure, vacuum pressure, gravitational force, etc. It is not important whether the first pressure is a higher or lower pressure. Rather, it is the pressure differential between the first and the second pressure (or any two consecutive pressures) that is important. It is also understood that the first pressure may be ambient pressure. Generally, ambient pressure is the atmospheric pressure at the place where the dough is processed. For example, ambient pressure at sea level is 29.92 inches of Hg, at 1000 feet above sea level it is 28.86 inches of Hg, and at 5000 feet it is 24.90. It is understood that ambient pressure varies with altitude.

For example, the method of the present invention incorporating a vacuum exercising step results in a reduced proofing time requirement for bread (e.g., 20-40 minutes proofing time for a 600 g dough piece), rolls (e.g., 10-20 minutes proofing time for a 50 g dough piece) and doughnuts (e.g., 15-25 minutes proofing time for 100 g dough piece) without affecting the baked specific volume of the final product. Under the same proofing conditions (e.g., yeast concentration, temperature and humidity), bread (600 g) would require 50-120 minutes of proofing, rolls (50 g) would require 30-90 minutes of proofing and doughnuts (100 g) would require 45-100 minutes of proofing.

The change in pressure can be effected at different rates. For example, a 5 minute pressure cycle can be used. The starting point for the pressure cycles can be below the ambient pressure (i.e., vacuum) or at ambient pressure or above ambient pressure. However, a key feature is that the dough is subjected to vacuum (e.g., a pressure lower than about 30 inches of Hg), preferably to a pressure of at least 5 to 10 inches of Hg below ambient pressure, including integers, 0.1 inches of Hg and ranges therebetween, during each cycle. The duration of each cycle and the pressure (i.e., increasing or decreasing with subsequent cycle) is determined by the value of pressure and by the time, which is necessary for the required increase in the volume of dough piece. For a 4 ounce roll, in one embodiment, a pressure differential of 15 inches is used. For larger breads (e.g., about 600 g and greater) a greater pressure differential, up to 20 inches of Hg, may be needed.

At least one cycle of alternating higher and lower pressure is needed. A pressure cycle as used herein means the sequence of pressure changes starting from a first pressure that either increases or decreases to a second pressure and is brought back to the value of the pressure. In one embodiment, the first pressure is the ambient pressure and the second pressure is lower than the ambient pressure. A preferred range of the cycles is 1 to 10 cycles. In various embodiments, the dough can be subjected to 1, 2, 3, 4, 5, 6, 7, 8, 9, or 10 cycles. Depending upon the type of dough product, the number of indicated pressure cycles could take any value within the range from 1 to 10 (for example, with French bread rolls it is preferable to have from 3 to 5 cycles). It is believed that excessive cycling (>10) will damage the dough such as give it a wrinkled surface. Based on the teachings herein, it is within the purview of one having skill in the art to optimize pressure differential and number of cycles.

The rate of the pressure change can be varied. Generally, a slower rate is better for preserving the integrity of the dough. The rate of pressure change can be from 0.01 psi/second (0.020 inch of Hg/second) to 1.9 psi/second (3.9 inches of Hg/second), including all 0.1 psi/second (0.20 inch of Hg/second) and ranges therebetween. In one embodiment, the rate of pressure change can be from 0.25 psi/second (0.51 inch of Hg/second) to 1.5 psi/minute (3.1 inch of Hg/second).

In one embodiment, the dough is subjected to a pressure differential of between 5 and 20 inches over a period of 1-200 seconds (a half cycle). In a preferred embodiment, the dough is subjected to a pressure differential of between 10-15 inches of Hg over a period of 10-30 seconds (a half cycle). In another embodiment, for a 1.5 ounce roll, a half cycle is from 10-20 seconds, while a full cycle is from 20-40 seconds and for a 4.0 ounces roll, a half cycle can be 20-30 seconds. Larger amounts of dough may require up to one minute for a full cycle.

During the pressure cycles, the time that the dough is held at the lower pressure is defined here as the lag time. While no lag time is needed for this invention, the lag time can be up to 5 minutes, including all values in seconds and all ranges between 1 second and 5 minutes). In one embodiment, the pressure is reduced to the lower pressure and subsequently, the pressure increase cycle is immediately initiated, resulting in a lag time of essentially zero. Lag time may be useful for larger dough (4 ounces or more) to enable the core of the dough to be subjected to adequate pressure differential. Thus, for dough pieces greater than 4 oz, the lag time can be 0.5, 1.0, 1.5, 2.0, 2.5, 3.0, 3.5, 4.0, 4.5 or 5.0 minutes (and all values to the tenth decimal point therebetween). Alternatively or additionally a slower rate of pressure change will also enable the core to be subject to an adequate pressure differential.

Pressure differential can be applied to the dough by placing the dough in a container and providing ambient, positive or negative pressure in the container. The creation of negative pressure is typically done by creating the desired level of vacuum and positive pressure can be created by infusing gas such as air into the container.

Values of pressure, character and rate of its variation, degree of increase in the specific volume of the dough piece could also be different with different cycles depending upon the type of final product. The specific volume after proofing is about 1.9 to 2.2 cc/g. Depending upon the type of dough product, the volume of the final product could amount to 3.5 to 7 cc/g (for example, for dinner rolls the weight of which is 1.5 oz, the final volume is 3.5 cc/g). For example, for a 1.5 oz or a 4 oz roll, the raw dough volume is typically 0.9 to 1.1; the specific volume after proofing is 1.9 to 2.2. The specific volume does not change after exercising. The final specific volume after baking is expected to be 3.5, 4.0, 4.5, 5.0, 5.5, 6.0, 6.5, 7.0 cc/g, and all values to 0.1 cc/g and all ranges between 3.5 and 7.0. Without intending to be bound by any particular theory, it is believed that exercising the dough enables the restructuring of the dough matrix and creation of air cells such that a high specific volume can be achieved after baking.

The step of exercising does not result in a significant overall increase in the specific volume of the dough. While during the exercising step itself the specific volume of the dough is increased, upon completion of the exercising step and return of the dough to ambient pressure, the dough returns to its specific volume prior to the exercising step except to the extent the there is continued fermentation during the exercising step. Such fermentation is not expected to result in an increase of more than 0.2 cc/g.

In one experiment it was observed that for 1.5-oz product, dimensions of the dough after various stages of processing were as follows (the measurements indicated in inches): after rounding: height: 1.08, diameter: 1.91; after resting: height: 1.38, diameter: 2.38; and after exercising: height: 1.47, diameter: 2.63.

In another embodiment, the exercising is mechanical exercising. In one embodiment, the dough matrix is stretched at least once along one axis and allowed to relax in the same axis to create a dough matrix that will reduce the proofing time by about 50 to 90% of what is typically required (typical proofing time is 60 to 90 minutes) and yet result in a finished (baked, cooked or fried) product with good flavor, uniform crumb, and consistent crust formation.

While not intending to be bound by any particular theory, it is believed that exercising the dough, at least in part, contributes to reducing the proof time required to make a baked product having a desired specific volume. Further, it has been observed that exercising the dough results in an increase in the number of larger size cells and a decrease in the number of total air cells. There was no significant difference in the degree of roundness of the cells.

At the end of the process, the dough is brought back to the atmospheric pressure.

In one embodiment, the method of the present invention consists essentially of the steps discussed herein. In another embodiment, the method consists of the steps discussed herein.

In one embodiment, the process of the present invention comprises, consists essentially of or consists of the steps in the sequence described herein.

In the method of making the dough, in one embodiment, scores could be made on the surface of a dough piece. Scoring can be done prior to subjecting the dough piece to the pressure differential cycles, at any stage during the cycles, or after the exercising step. It is convenient to do it for the final products, in case the crust is sufficiently quickly formed during the process of baking, while the process of rising of a product being baked still goes on. Surface scores prevent the rupture of the formed crust, providing for the required external appearance of the finished bread. The scores are typically 3 to 4 mm deep.

In one embodiment, a combination or combinations of exercising and scoring can be used. Exercising was observed to be particularly advantageous when used with a surface treatment such as scoring. Products that are typically scored include, but are not limited to, Bolillo, French bread, Italian bread, hoagie, sub rolls and dinner rolls.

After proofing and exercising, the dough is ready for baking or preparing using some other means. For example, after exercising, the dough can be directly transferred to any oven for baking or cooked using other means of exposure to heat including frying.

Method of Baking or Otherwise Preparing.

The dough of the present invention can be baked in a conventional oven, such as a convection-rack oven or cooked in some other way, such as frying. In one embodiment, the proofed and exercised dough of the present invention can be baked in an oven which provides a combination of one or more modes of heating such as direct fire, heated oil, forced air, convection, microwave and/or infrared. Thus, baking could be carried out according to any known method (for example, by convective heating, using microwave, infrared or radio-wave radiation, using electro-contact method or other appropriate methods or combination of these methods). The baking does not require reduced pressure and thus no special equipment is required to reduce or alter the pressure in the oven during baking Because of this, the exercised dough can be can be conveniently used in bakeries, restaurants and the like where there is a need for quick proofing and baking.

Example 1

This example provides ranges of components for a French bread dough.

| Ingredient | Range (% of flour) | One Embodiment |
| --- | --- | --- |
| High gluten flour | 100 | 100 |
| Gluten | 0-6 | 4 |
| Compressed yeast | 7-14 | 9 |
| High fructose corn syrup | 1-6 | 5 |
| Dextrose | 0-2 | 0.5 |
| PBRI | 0.01-0.07 | 0.05 |
| SSL | 0.1-0.5 | 0.5 |
| ADA | 0.005-0.03 | 0.01 |
| Tolerance Plus with AA | 0.1-1.0 | 0.5 |
| Guar gum | 0.1-0.8 | 0.5 |
| Panodan | 0.1-0.8 | 0.4 |
| Soybean oil (optional) | 0.5-2.0 | 1.5 |
| Salt | 0.5-4.0 | 1.5 |
| Water | 55-75 | 60 |

All ingredients were mixed together using a Hobart mixer (Urban Raiff & Sons, Inc., Buffalo, N.Y.). The dough was divided and rounded into balls. Individual dough portions were then pre-proofed in a proofer. The pre-proofed rolls were then subjected to vacuum pressure cycles. For each pressure cycle, the rolls were increased to the volume of 3.5 times the original volume, with a maximum pressure of 17 in of Hg, and then revert to the atmospheric pressure. After 3 cycles of pressure changes, the rolls can be directly placed in a rack oven for finishing (for example, at 375° F. for a suitable time).

Example 2

The number of air cells were determined for both a 1.5 oz dinner roll made of dough that was exercised and a dinner roll made of dough that was not exercised. Exercising was carried out by subjecting the dough to a 10 inches pressure differential starting at ambient pressure for 3 cycles with each half cycle lasting about 10-12 seconds. A center-cross section of a vacuum-exercised, pre-proofed, frozen dough was cut using a sharp knife. The cut cross-section of the frozen dough was examined under a stereomicroscope at a magnification of 400×. Caution was taken to keep the sample from thawing by means of cold ambient temperature environment. Pictures of three random circular spots (1 centimeter in diameter each) on the cut cross-section of the frozen dough were taken using a high magnification digital camera. The pictures were transferred to imaging software (Paxit). The air cells were manually marked and characterized for the area and roundness using the software. Results were then presented in the form of a histogram. This procedure was repeated for dough with similar unit operations except that vacuum-exercising was not performed.

Figure 1B:
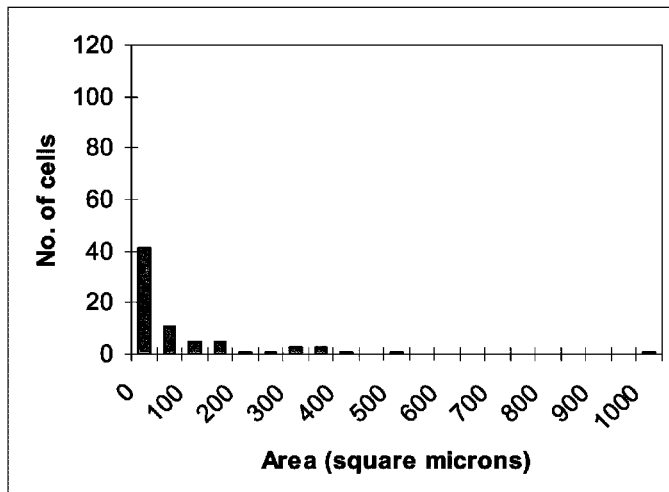
Figure 2A:
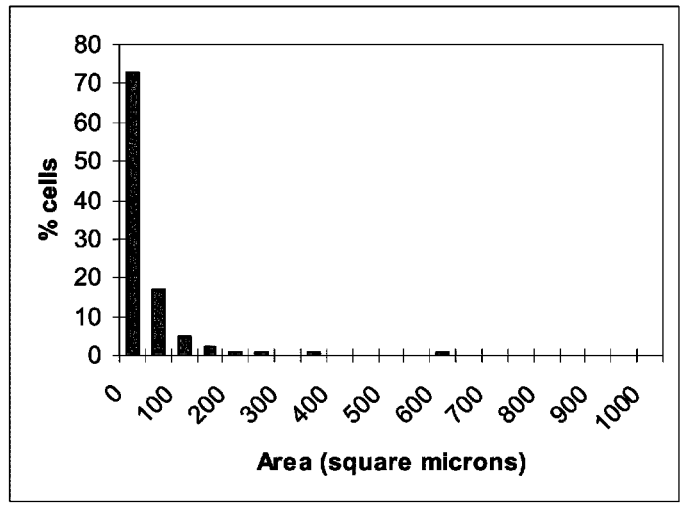
FIGS. 2A and 2B are representations of the air cells from FIG. 1 expressed as percent of total air cells as a function of air cell area in dough which has not been subjected to exercising (2A) or from dough which has been subjected to exercising (2B).
Figure 2B:
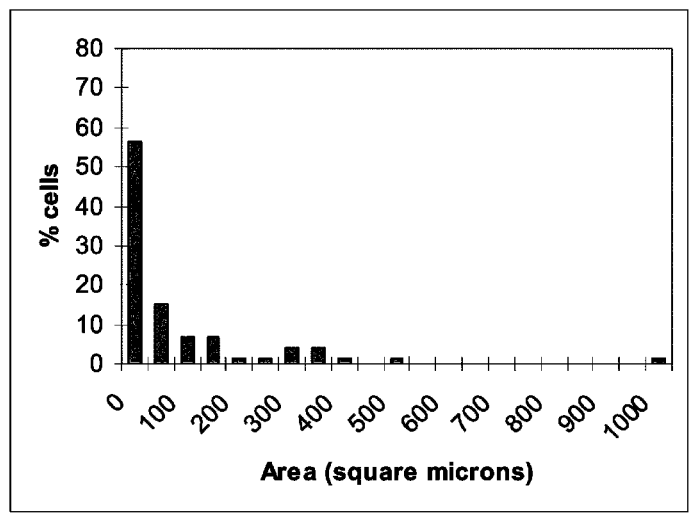

The results of the experiment (FIGS. 1A, 1B, 2A and 2B) show that with exercising, a higher number of larger air cells are observed. For a dinner roll, the total number of air cells without exercising was 137 while the total number of air cells for the dinner roll with exercising was 73. Therefore, it is considered that the reduction in the number of air cells is due to coalescing of the smaller cells into larger cells. In addition, the bar graphs for the size of the air cells indicates that larger cells were observed compared to if the dough was not subjected to exercise. No significant difference was observed in the degree of roundness of the cells.

Example 3

The effect of exercising was determined on proofing time for a 1.5 oz dinner roll. The dough was prepared and exercised as described in Examples 1 and 2. The ingredients were mixed, the dough was proofed for 12 minutes at 95° F. and 85% RH, exercised as described in Example 2, and baked immediately after exercising. If the dough was not subjected to exercising, a proofing time of at least 60 minutes was required to achieve the same baked specific volume of 4 cc/g.

What is claimed is:

1. A method of producing a dough comprising the steps of:
   a) preparing dough by mixing flour having a gluten content in the range of 10 to 20%, a lipid source, water, emulsifier, leavening agent and stabilizer;
   b) forming gas nucleation sites in the dough to a specific volume of 1.9 to 2.2 cc/g;
   c) exercising said dough by subjecting it to at least two cycles of alternating first and second gas pressures, and wherein one of said first and second pressures is greater than atmospheric pressure and the other pressure is below atmospheric pressure, and wherein a pressure differential between said first and second pressures is 1 to 20 inches of Hg;
   d) allowing said dough to return to atmospheric pressure; and,
   e) proofing said dough;
   wherein a proofing time of said dough is at least 33% less than a time required to achieve the same specific volume under the same proofing conditions as in step b) if a dough was not subjected to step c).

2. The method as defined in claim 1, further including the step of f) freezing said dough.

3. The method as defined in claim 1, wherein the step of forming said gas nucleation sites is performed by resting said dough.

4. The method as defined in claim 2, wherein the step of forming said gas nucleation sites is performed by resting said dough.

5. The method as defined in claim 1, wherein said pressure differential between said first pressure and said second pressure is 10 to 15 inches of Hg.

6. The method as defined in claim 1, wherein said exercising step is performed for 3 to 10 cycles of pressure differential.

7. The method as defined in claim 1, wherein a duration of subjecting said dough to said first pressure during each cycle is 10 to 30 seconds and a duration of subjecting said dough to said second pressure during each cycle is 10 to 30 seconds.

8. The method as defined in claim 4, wherein a duration of subjecting said dough to said first pressure during each cycle is 10 to 30 seconds and a duration of subjecting said dough to said second pressure during each cycle is 10 to 30 seconds.

9. The method as defined in claim 1, wherein said dough is rested at ambient temperature and humidity for 1 to 60 minutes prior to exercising.

10. The method as defined in claim 8, wherein said dough is rested at ambient temperature and humidity for 1 to 60 minutes prior to said step of exercising said dough.

11. The method as defined in claim 1, further comprising a step for scoring said dough prior to said step of exercising said dough or after said step of exercising said dough.

12. The method as defined in claim 1, wherein said stabilizers include hydrocolloids comprising natural or synthetic gums in the amount of 0.2 to 1.6%.

13. The method as defined in claim 1, wherein said emulsifier is in the amount of 0.05 to 0.5%.

14. A method of producing a dough comprising the steps of:
  a) preparing a dough by mixing flour, water, emulsifier, yeast and stabilizer;
  b) forming gas nucleation sites in said dough which increase a specific volume of said dough;
  c) exercising said dough by subjecting it to at least one cycle of alternating first and second gas pressures, said first gas pressure greater than said second gas pressure; and,
  d) proofing said dough;
  wherein a proofing time of said dough is at least 33% less than a time required to achieve the same specific volume under the same proofing conditions as in step b) if the dough is not subjected to step c).

15. The method as defined in claim 14, further including the step of e) freezing said dough.

16. The method as defined in claim 14, wherein one of said first or second pressures is lower than atmospheric pressure and the other pressure is greater than atmospheric pressure.

17. The method as defined in claim 15, wherein one of said first or second pressures is lower than atmospheric pressure and the other pressure is greater than atmospheric pressure.

18. The method as defined in claim 17, wherein a pressure differential between said first and second pressures is 1 to 20 inches of Hg.

19. The method as defined in claim 14, wherein the step of forming gas nucleation sites is performed by resting said dough, said dough is rested at ambient temperature and humidity between 1 and 60 minutes prior to said step of exercising said dough.

20. The method as defined in claim 16, wherein the step of forming gas nucleation sites is performed by resting said dough, said dough is rested at ambient temperature and humidity between 1 and 60 minutes prior to said step of exercising said dough.

21. The method as defined in claim 18, wherein the step of forming gas nucleation sites is performed by resting said dough, said dough is rested at ambient temperature and humidity between 1 and 60 minutes prior to said step of exercising said dough.

22. The method as defined in claim 14, wherein said exercising step is performed for 3 to 10 cycles of pressure differential.

23. The method as defined in claim 20, wherein said exercising step is performed for 3 to 10 cycles of pressure differential.

24. The method as defined in claim 21, wherein said exercising step is performed for 3 to 10 cycles of pressure differential.

25. The method as defined in claim 19, wherein said exercising step is performed for 3 to 10 cycles of pressure differential.

26. The method as defined in claim 14, wherein said stabilizers include hydrocolloids comprising natural or synthetic gums in the amount of 0.2 to 1.6%, said emulsifier in the amount of 0.05 to 0.5%.

27. The method as defined in claim 24, wherein said stabilizers include hydrocolloids comprising natural or synthetic gums in the amount of 0.2 to 1.6%, said emulsifier in the amount of 0.05 to 0.5%.

* * * * *